United States Patent
Lianza

(10) Patent No.: US 7,639,901 B2
(45) Date of Patent: Dec. 29, 2009

(54) APPARATUS AND METHOD FOR CALIBRATION OF DLP/DMD PROJECTION IMAGE SYSTEMS

(75) Inventor: Thomas A. Lianza, Bedford, NH (US)

(73) Assignee: X-Rite Europe GmbH, Regensdorf (CH)

(*) Notice: Subject to any disclaimer, the term of this patent is extended or adjusted under 35 U.S.C. 154(b) by 780 days.

(21) Appl. No.: 11/440,336

(22) Filed: May 24, 2006

(65) Prior Publication Data

US 2006/0268387 A1 Nov. 30, 2006

Related U.S. Application Data

(60) Provisional application No. 60/685,135, filed on May 24, 2005.

(51) Int. Cl.
*G02B 6/00* (2006.01)
*G02B 26/00* (2006.01)
*G03B 21/14* (2006.01)

(52) U.S. Cl. .......................... 385/12; 385/115; 385/116; 385/88; 385/89; 385/901; 359/290; 359/291; 359/292; 353/88; 353/89; 353/84; 353/69

(58) Field of Classification Search ................. 385/115, 385/116, 88, 89, 901, 12; 353/88, 89, 84, 353/69; 345/587, 207, 690; 250/227.11; 359/290, 291, 292
See application file for complete search history.

(56) References Cited

U.S. PATENT DOCUMENTS

| | | | |
|---|---|---|---|
| 5,386,253 A | 1/1995 | Fielding | 348/745 |
| 5,568,964 A | 10/1996 | Parker et al. | 362/32 |
| 6,927,891 B1* | 8/2005 | Maheshwari | 359/291 |
| 7,233,722 B2* | 6/2007 | Lee | 385/31 |
| 2002/0171834 A1* | 11/2002 | Rowe et al. | 356/418 |
| 2003/0179435 A1 | 9/2003 | Tomiya | 359/291 |
| 2004/0218177 A1 | 11/2004 | MacKinnon et al. | 356/326 |
| 2004/0263802 A1* | 12/2004 | Seki et al. | 353/99 |
| 2005/0243415 A1* | 11/2005 | Lowe et al. | 359/443 |
| 2006/0268387 A1* | 11/2006 | Lianza | 359/290 |

OTHER PUBLICATIONS

Extended European Search Report dated Oct. 16, 2006.

* cited by examiner

*Primary Examiner*—Brian M Healy
(74) *Attorney, Agent, or Firm*—McCarter & English, LLP

(57) ABSTRACT

Display systems that utilize digital micro-mirror device (DMD) technology are finding wide application in the areas of projection systems for color display. The common name for such systems is digital light processing projection systems or DLP projection systems. The systems and methods described herein utilize the non-imaging light to monitor and calibrate the projected image since the high levels of illumination and extreme temperatures of the imaging light require careful attention to the manner of light collection. Light collection is accomplished in a waste gate area by a light collector, e.g., an optical fiber mat, and the collected light is communicated to an associated sensor. The technique is non-invasive and may be applied to existing designs with minimal modification.

20 Claims, 4 Drawing Sheets

APPARATUS AND METHOD FOR CALIBRATION OF DLP/DMD PROJECTION IMAGE SYSTEMS

CROSS-REFERENCE TO RELATED APPLICATIONS

The present application claims the benefit of a co-pending, commonly assigned provisional patent application entitled "Apparatus And Method For Calibration Of DLP/DMD Projection Image Systems" which was filed on May 24, 2005, and assigned Ser. No. 60/685,135. The entire contents of the foregoing provisional patent application are hereby incorporated by reference.

BACKGROUND

1. Technical Field

The present disclosure relates generally to an apparatus and method for calibrating color display systems that use digital micro-mirror device (DMD) technology in projection image systems. More particularly, the present disclosure relates to a digital light processing (DLP) system that uses non-imaging light to monitor and calibrate the projected image, such that the apparatus and method are non-invasive and may be applied to existing DLP systems with minimal modification.

2. Background Art

Digital Light Processing™ and DLP™ technology (both trademarked by Texas Instruments, Inc.) refer to an all-digital display technology that is used in projectors and televisions. A DLP projection system is an image projection system comprising a powerful light source focused on a controlled multiple mirror element, with a lens assembly focusing on a plane defined by each mirror of the multiple mirror element and projecting the reflected light onto an image screen. The mirrors are controlled digitally to provide an on/off signal for each image pixel. This mirror assembly is referred to as the DMD, a semiconductor-based "light switch" array of thousands of individually addressable, tiltable, mirror-pixels. The DMD chip is a spatial light modulator (SLM) and brings many advantages to light-steering applications.

When a DMD chip is coordinated with a digital video or graphic signal, a light source, and a projection lens, mirrors of the DMD can reflect an all-digital image onto a screen or other surface. DLP systems include the DMD and surrounding electronics associated with it.

Each mirror of the DMD is one of thousands of tiny mirrors in an array and is attached to one or more hinges mounted on support posts permitting the mirror to tilt. Each mirror is spaced by means of an air gap over underlying addressing circuitry. The addressing circuitry provides electrostatic forces which cause each mirror to selectively tilt.

For display applications, the DMD is addressed with image data. In accordance with this image data, light is selectively reflected from each mirror and projected onto a viewing screen. The combination of light and dark mirrors forms an image. Modulation techniques are used to provide grayscale image "frames". A quick succession of frames is perceived by the viewer as a full motion display.

There are at least two approaches to generating color displays with a DMD display system. One approach is to generate multiple images with multiple SLMs, typically one SLM each for red, green and blue. Each image has a desired intensity and the images are combined to result in a correctly colored display. A second approach is to use a single SLM and generate images for each color (red, green, and blue) sequentially. A white light source is filtered through a revolving color wheel, such that a desired color illuminates the corresponding image. The differently colored images are generated so quickly that the eye integrates them into a correctly colored frame.

When individual mirrors direct light through the imaging lens, the imaging surface is selectively illuminated. When the mirror reflects light away from the imaging lens, the reflected light is collected in an area referred to as a waste gate. DLP systems that use a single DMD element typically use a spinning color filter wheel to separate light (e.g., red, green, blue) into sequential color outputs. During the active time for a single color, the mirror elements are addressed to form an image pixel. The individual mirrors actively aim light thru the imaging lens for a time proportional to the intensity, which corresponds to a desired image pixel intensity. The appearance of a continuous change in intensity can be enhanced by techniques such as frame multiplexing and the addition of fixed pattern noise.

DLP technology made possible by the advent of DMD chips has led to the emergence of significant new projection display technology over the last decade. In addition to commercial success in high definition television (HDTV) and theater projection system areas, DLP technology finds potential in the areas of adaptive lighting, medical imaging, photofinishing, biotechnology applications, lithography, spectroscopy, and scientific instrumentation, to name a few.

Most, if not all, of these applications can be improved significantly by the addition of a real-time and/or static calibration means to assure maintenance of the inherent high quality image in the presence of known factors of degradation, such as spectral and intensity changes in the light source. Furthermore, a calibration means is desirable to adjust initial settings of the system, including compensating for aging and degradation of system elements, such as the light source, for example. Such compensation would advantageously account for accumulation of dirt films on system optical elements and light losses due to physical changes in the system over time.

It is normal and desirable to place calibration elements within a processing system, in this case a DMD device. However, the projection technology in DLP systems requires that a significant amount of light and corresponding heat be directed onto a relatively small area of the DMD chip. The concentration of light and associated heat in this small area raises operating temperatures and becomes a hostile environment for semiconductor sensors used in such image calibration elements. The challenge then becomes one of how to effectively calibrate such devices.

The calibration of such products is normally done by measuring reflected light from or light incident to the projection surface. The assignee of the present disclosure has manufactured products that incorporate the use of a lens cap technique. The lens cap-based process produces good results, but requires a cap to be put in place prior to measurement. Furthermore, placement of the cap may be difficult when the projection system is mounted on a high ceiling or behind a rear-projection screen.

Accordingly, despite that which is known from the prior art, a need remains for an apparatus and method for calibration of DLP/DMD projection imaging systems having certain desirable features and functionalities. In particular, a need remains for an embedded calibration apparatus and method that is not negatively impacted by heat factors and that requires no interruption of the optical path.

These and other advantageous features, functionalities and/or capabilities are provided according to an exemplary calibration device, system and/or method for a DLP system that uses a digital micro-mirror device (DMD) for modulation of projected image intensity, as disclosed herein.

SUMMARY OF THE DISCLOSURE

The disclosure herein provides advantageous calibration devices, systems and methods for a DLP system that uses a DMD device for modulation of projected image intensity. The disclosed calibration devices, systems and methods measure light that is deflected to a waste gate area as a result of system modulation. In an exemplary embodiment, light impinging on the waste gate area is collected with an optical fiber mat and passed to a calibration sensor. The light impinging on the waste gate area is used to accurately predict the light impinging on the image screen using a full scale-on-signal to full scale-off-signal to develop a contrast ratio as a basis for calibration. Dynamic and static calibration needs can then be calculated on a pixel-by-pixel basis and the information can be stored in the form of a lookup table or utilized in a calibration algorithm.

According to exemplary embodiments of the present disclosure, the calibration map generated through light measurement in a waste gate area may be applied to the drive constants for the DMD drive engine, i.e., the control system for the individual mirrors associated with a DMD system. Alternatively, the calibration map may be interfaced with data communications to effect desired calibration thereof, e.g., by interfacing with the data stream as it enters an image display buffer or the like.

Additional advantageous features and functionalities associated with the systems and methods of the present disclosure will be apparent from the detailed description which follows, particularly when read in conjunction with the appended figures.

BRIEF DESCRIPTION OF THE DRAWINGS

Structural and functional aspects, features, and advantages of the present disclosure will be understood and the manner of making and using such structures will become more readily apparent when the following description is reviewed by persons skilled in the art in conjunction with the accompanying drawings, wherein.

DETAILED DESCRIPTION OF EXEMPLARY EMBODIMENTS

The present disclosure provides an advantageous device, system and method for calibrating digital light projection systems. The disclosed device, system and method overcomes problems associated with conventional sensor techniques and, in particular, issues associated with isolating calibration sensor(s) from the extreme heat that is projected upon an element that is being calibrated. The disclosed calibration device, system and method takes advantage of the fact that the imaging device switches on for a time slot that is proportional to an intensity requirement of each pixel and switches off for the remainder of the time, where the imaging device uses mirror per pixel means. Further, each mirror can be addressed and positioned to pass light to an image screen (through an optical system) or to reflect the light to a waste area (also referred to a waste gate for purposes of the present disclosure). It is recognized that the light impinging on the waste area plus the light impinging on the image screen equal unity, where unity can be defined more specifically by the range of intensity reaching the waste gate area from full-on to full-off for the image.

Given that light impingement can be characterized by a sensor monitoring the light reaching the waste gate area, exemplary embodiments of the disclosed device, system and method use an optical fiber mat which can be configured and dimensioned to capture all of the light impinging on all of the waste gate area and to direct this light to a calibration sensor remote from the extreme heat of the waste gate area. By capturing and redirecting such light impingement in the waste gate area, the disclosed device, system and method permits the use of such rejected light for calibration purposes, thereby accomplishing, via the optical fiber collecting mat, a decoupling of the calibration sensor from the heat that accompanies the impinging light on the waste gate area. Further, the disclosed device, system and method facilitate positioning of a calibration sensor outside the primary projection element, thereby overcoming issues associated with the severe space limitations within the projection element.

Relative calibration is accomplished according to the present disclosure by measuring a "full light" to "full dark" ratio and developing a pixel by pixel calibration map in the form of a lookup table or algorithm. Absolute calibration is accomplished by adding a means to remotely sense the intensity and spectral character of the image on the screen to provide feedback for the waste gate calibration system that will be contained within the projection system. The calibration map may be applied to the drive constants for the DMD drive engine, i.e., the control system for the individual mirrors associated with a DMD system, or interfaced with a data stream to effect desired calibration thereof, e.g., by interfacing with the data stream as it enters an image display buffer or the like.

Figure 1:
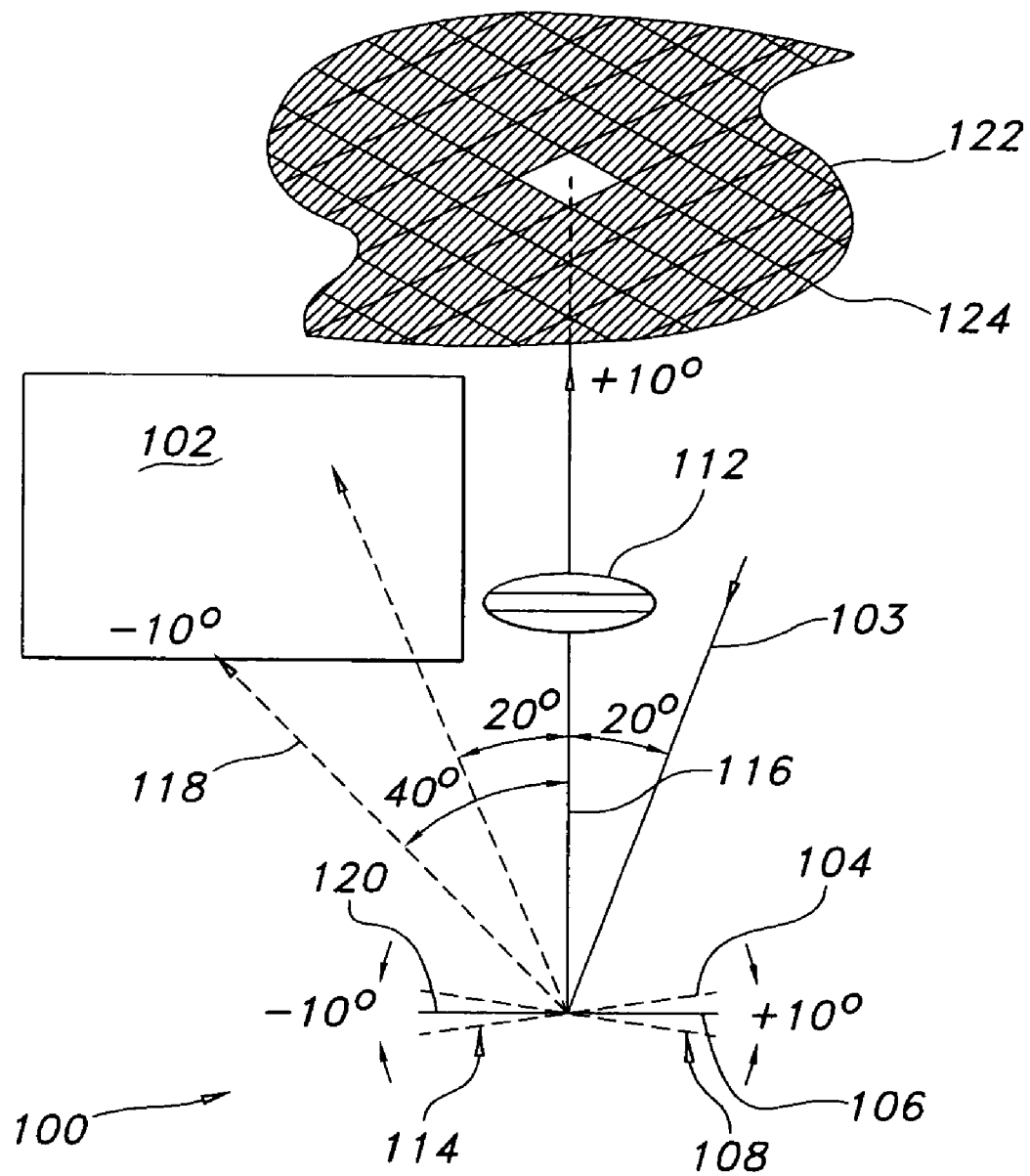
FIG. 1 is a schematic diagram of a conventional digital light processing system for a projector system illustrating a digital micro-mirror device reflecting light in both an image light channel and a waste light region or channel.

Referring now to FIG. 1, exemplary devices, systems and methods of the present disclosure utilize an internal path inside the DLP optics that contains a combination of raw lamp/filter illumination and image dependent illumination.

FIG. 1 is an illustration of a DLP projection system 100 depicting the DMD optical switching principle in conjunction with a waste light region or channel identified generally at 102. This channel is referred to as the "waste" channel, because all non-image related data is dumped into region 102. As illustrated in FIG. 1, light from an illumination device indicated by ray 103 enters at 20 degrees from the normal relative to a reflecting surface 104 defining a pixel mirror 106. When the pixel mirror 106 is rotated 10 degrees clockwise, as illustrated in position 108, a reflected beam 110 passes through a projection lens 112. Any reflected beam 110 passing through lens 112 is referred to as being reflected in an image channel. When mirror 106 is rotated 10 degrees counterclockwise, as illustrated in position 114 from a normal position to a primary projection axis or optical axis 116 corresponding to beam 110, the light is now reflected 40 degrees from the optical axis 116 indicated with beam 118. The light is reflected 40 degrees from the optical axis 116 because of the angular doubling of the reflection process. As mirror 106 moves into a position 120 normal to the optical axis 116 during the translation process, the light is reflected 20 degrees out of the field of the lens 112. The region between this deflection and the 40 degree deflection is what is termed the "waste" channel 102.

Channel 102 contains non-image and image dependent light. At this point in the light path, there is a very large, relatively static light component combined with the active signal. The active signal in this location is the light that has been deflected from a screen image 122. This signal can be considered the "negative" image of the image 122 on a screen 124. Algebraically, the illuminace at this point can be represented as:

$$Ws(t) \propto L(t)*((1-s(t))+K) \quad \text{Equation 1.}$$

where Ws(t) represents the illuminance signal in the waste channel 102, s(t) is the image signal, L(t) is the slowly varying lamp output signal and K is the direct current (DC) component of the deflected light in the channel 102. The (1−s(t)) term is present to indicate that the image signal is inversely proportional to the waste channel signal. In other words, when the screen 124 is dark, the waste channel signal is high and when the screen 124 is light, the waste channel signal is lower, recognizing that the light impinging on the waste area 102 plus the light impinging on the image screen 124 equal unity. Unity can be defined more specifically by the range of intensity reaching the waste gate area 102 from full-on to full-off for the image.

As stated earlier, the deflected or unwanted illumination from the DMD 106 is concentrated in an area that is described herein as the "waste gate" 102. Illumination levels and temperatures can be extreme in this area. Further, the waste gate 102 may often be of a relatively large size and/or oddly shaped. For this reason, a light collector that can be formed to be disposed in the waste gate and to thereby capture light impinging on the waste gate 102 is desirable.

Figure 2:
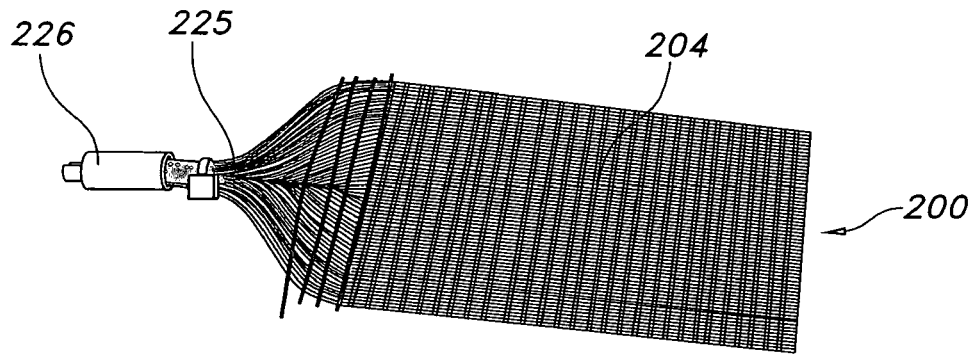
FIG. 2 is a perspective view of an exemplary optical fiber mat for use in calibrating a projector system, e.g., a projector system of the type depicted in FIG. 1, in accordance with an exemplary embodiment of the present disclosure.
Figure 3:
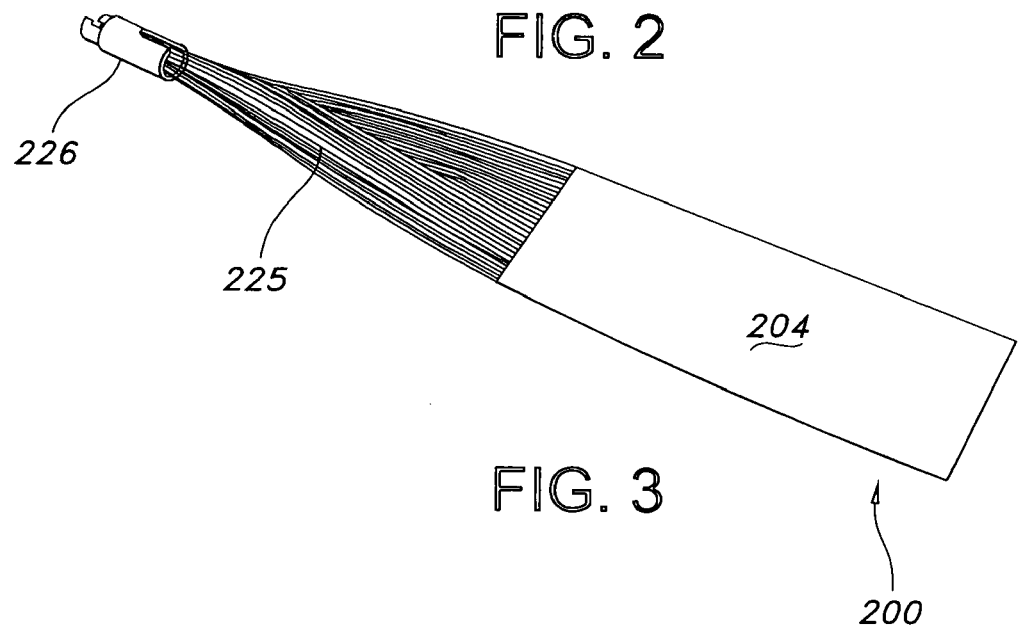
FIG. 3 is a perspective view of an optical fiber mat for use in calibrating a projector system, e.g., a projector system of the type depicted in FIG. 1, in accordance with another exemplary embodiment of the present disclosure.
Figure 4:
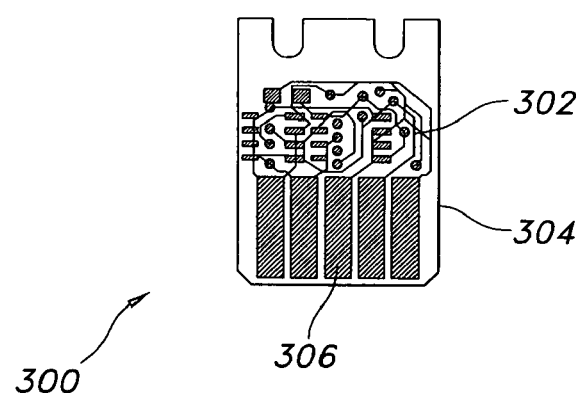
FIG. 4 is a schematic plan view of a calibration sensor for operable communication with an optical fiber mat, e.g., either of the optical fiber mats of FIGS. 2 and 3, in accordance with an exemplary embodiment of the present disclosure.

Referring to FIGS. 2-4, exemplary embodiments of a device, system and method for use in calibration of a DLP/DMD projection image system are illustrated, including a light collector 200 in operable communication with a sensor 300 monitoring the light reaching the waste gate area 102. Exemplary embodiments of the disclosed system use a large area light pipe as a light collector (FIGS. 2 and 3), which can be shaped to capture all of the light impinging on all of the waste gate area 102 and to direct this light to a calibration sensor 300 (FIG. 4), thus using the rejected light for calibration.

The exemplary light collector 200 of FIG. 2 is a fabric material with optical fibers 204 woven into the material. An exemplary light collector 200 is also illustrated in FIG. 3 with optical fibers 204 bonded onto an outer diffuser material. When used in a DLP projector application, the bonded and/or woven materials are preferably black in color to minimize potential extraneous flare. Accordingly, the disclosed device, system and method accomplish, via light collector 200 (e.g., an optical fiber collecting mat), a decoupling of the calibration sensor 300 from the heat that accompanies the impinging light, since the sensor 300 is remote therefrom. Further, the disclosed device, system and method provide means to position a calibration sensor 300 outside of the primary projection element, a requirement due to severe space limitations within the projection element.

FIG. 4 illustrates a color sensor form factor 300 for an embedded sensor application in accordance with an exemplary embodiment of the present disclosure. Color sensor 300 includes a circuit 302 designed to utilize a single color detector with a processor to manage the sensor. In an exemplary embodiment, a sensor board 304 supporting the sensor functionality measures approximately 2.2 cm×1.5 cm and uses an edge card connector (5 pin) as the main form of attachment (generally indicated at 306). Exemplary color sensor 300 utilizes an inter-integrated circuit (I2C) bus for communication.

A number of processor options are available for use in the color sensor 300. The lowest cost solution simply manages the sensor and physically collects the data from the sensor. A higher cost solution is also available which actually performs the calibration function utilizing the I2C bus or serial port to send physical commands to the processor.

Figure 5:
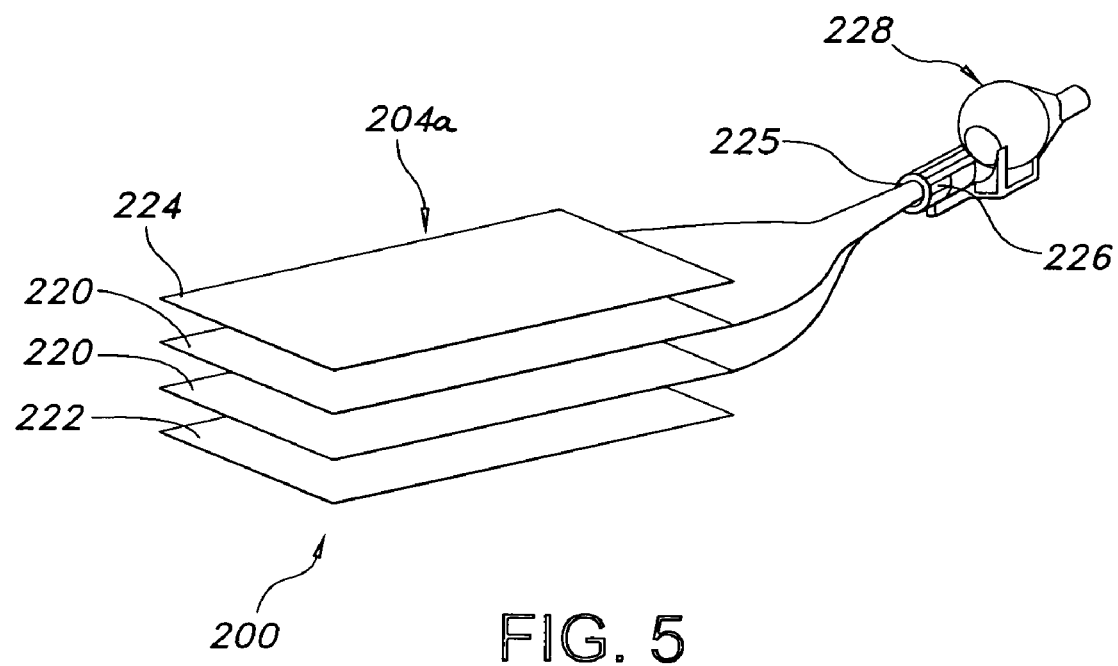
FIG. 5 is an exploded perspective view of a woven optical fiber mat illustrating multiple layers thereof and a fiber optic cable bundle extending therefrom in communication with a light source as it is conventionally used to diffuse a backlight of a liquid crystal display (LCD)

Referring now to FIG. 5, one unique example of a light collector 200 is illustrated as a woven fiber optic light emitting panel 204a commercially available from Lumitex, Inc. (Strongsville, Ohio). While designed as a light emitter to be used in conjunction with a liquid crystal display (LCD) panel as a backlight, it can also be used in an inverted mode to collect light over a large area and to concentrate the light to a small area.

Figure 6:
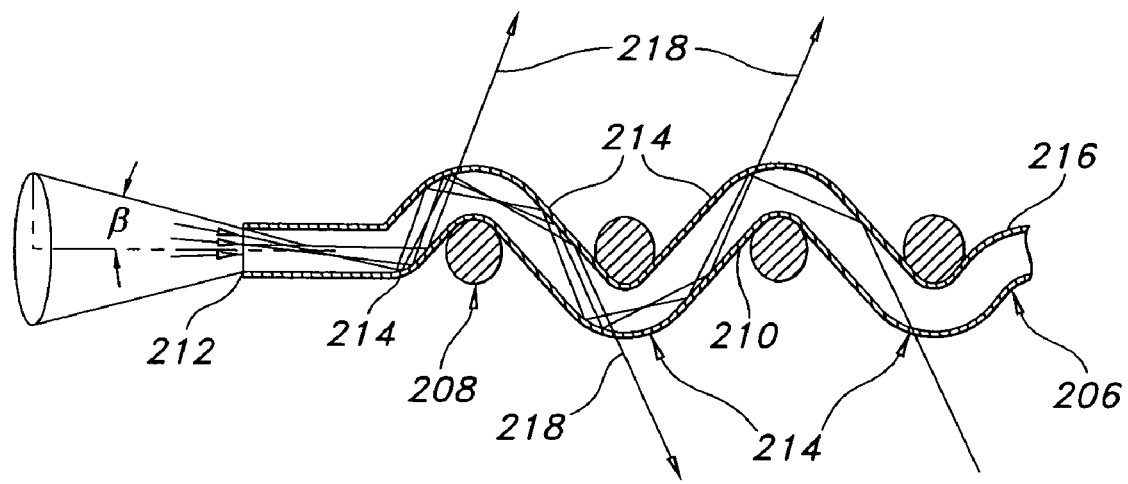
FIG. 6 is an enlarged side view of one of the optical fibers interwoven with fill thread defining a layer of the exemplary woven optical fiber mat of FIG. 5 demonstrating light transmission thereof as it is conventionally used to diffuse a backlight of the LCD.

With reference to FIG. 6, an exemplary woven fiber optic light emitting panel 204a is woven from plastic optical fibers 206 with fill thread 208 woven to transversely abut an apex 210 defining each macro-bend 211 in the optical fiber 206. The thin, flat panel 204a is heat and electromagnetic interference (EMI) free and provides superior brightness, longer life, and significant design flexibility when compared to other lighting products.

As in other fiber optic technologies, light is emitted from the panel 204a via light entering each highly polished fiber end 212. However, computer controlled "macro-bends" 214 cause the transmitted light to be emitted from the sides of the fibers 206 through the cladding 216, indicated generally with rays 218. The cladding 216 itself is not scratched, hot-stamped or etched. According to exemplary embodiments of the present disclosure, precisely engineered construction causes all light to be emitted uniformly along the length of the panel 204.

Referring again to FIG. 5, layers of fiber optic weave 220 are assembled, together with double sided adhesive (not shown), into as many as eight layers (two layers shown). A Mylar reflector 222 is laminated to the back and a clear vinyl top layer 224 is added for extra durability. For some applications (such as LCD backlighting), a separate diffuser layer is placed between the top weave layer 224 and the clear vinyl.

With further reference to FIGS. 2, 3 and 5, the optical fibers 206 typically extend from the panel 204 in a cable form generally indicated at 225, are bundled into a brass ferrule 226, for example, and then the ends 212 are highly polished. The ferrule 226 is generally connected to a remote light source 228. Light source 228 may take a variety of forms, e.g., a single LED, a low current incandescent lamp/bulb, and/or a halogen lamp with a variety of power ratings. Most light sources are direct current (DC) and have lamp lives ranging from 10,000 hours to 100,000 hours.

However, in the present disclosure, the light panel/light collector 200 is used in an inverted mode to collect light at panel 204a over a large area and to concentrate the light to a small area at ends 212 of highly polished fibers 206 surrounded by ferrule 226. The ends 212 of the woven panel assembly are in turn in operable communication with light sensor 300, as is shown schematically in FIG. 4.

Use of an optical fiber mat advantageously isolates the heat from the light that is being collected, enabling the use of semiconductor light sensing elements or other light sensing means without the potential for damage, and reduces thermally aggravated parameter drift. Further, use of an optical fiber light collection mat allows the calibration sensor to be positioned remotely from the DMD device, solving the inherent problem of available space.

Use of the optical fiber mat depicted in FIGS. 2-6 as a calibration device will now be described. When the fiber mat/light collector 200 is combined with an optical sensor 300, as schematically depicted in FIG. 4 having integral red, green, blue (R, G, B) filters, it is possible to calibrate the sensor/collector combination and then use this sensor to establish and/or maintain calibration of the projector. In an exemplary embodiment, a RGB integral sensor 300, such as the Taos TCS230, commercially available from Texas Advanced Optoelectronic Solutions, Inc. (Plano Tex.), is used as the primary sensor. This sensor has integral RGB and unfiltered sensors in a 4×4 grid. The sensor converts light intensity directly to a pulse train with a frequency proportional to the intensity of the red, green, and blue components.

The individual colors are addressable under digital control and the output of each sensor is a time varying wave form whose frequency is linearly proportional to the light striking the sensor. If the pulses out of the sensor are counted for a fixed period of time, the resultant value is essentially the integral of intensity X time, or the effective exposure.

$$H = \int_0^t E(t)dt \cong k * \sum_0^t s(t).  \quad \text{Equation 2}$$

where:
H is exposure in micro-watts/m²-secs
E is irradiance in micro-watts/m²

As described above, the light in the waste gate area is inversely proportional to the light striking the screen 124 (FIG. 1). The signal in the waste gate 102 is greatest when the screen 124 is dark and the lowest when the screen 124 is light. A "bias" term is required to correlate the image on the screen 124 to the light in the waste gate 102.

$$E_{RedScreen} = Bias_{Red} - H_{Red}$$

$$E_{GreenScreen} = Bias_{Green} - H_{Green}$$

$$E_{BlueScreen} = Bias_{Blue} - H_{blue}  \quad \text{Equation Set 3}$$

Figure 7:
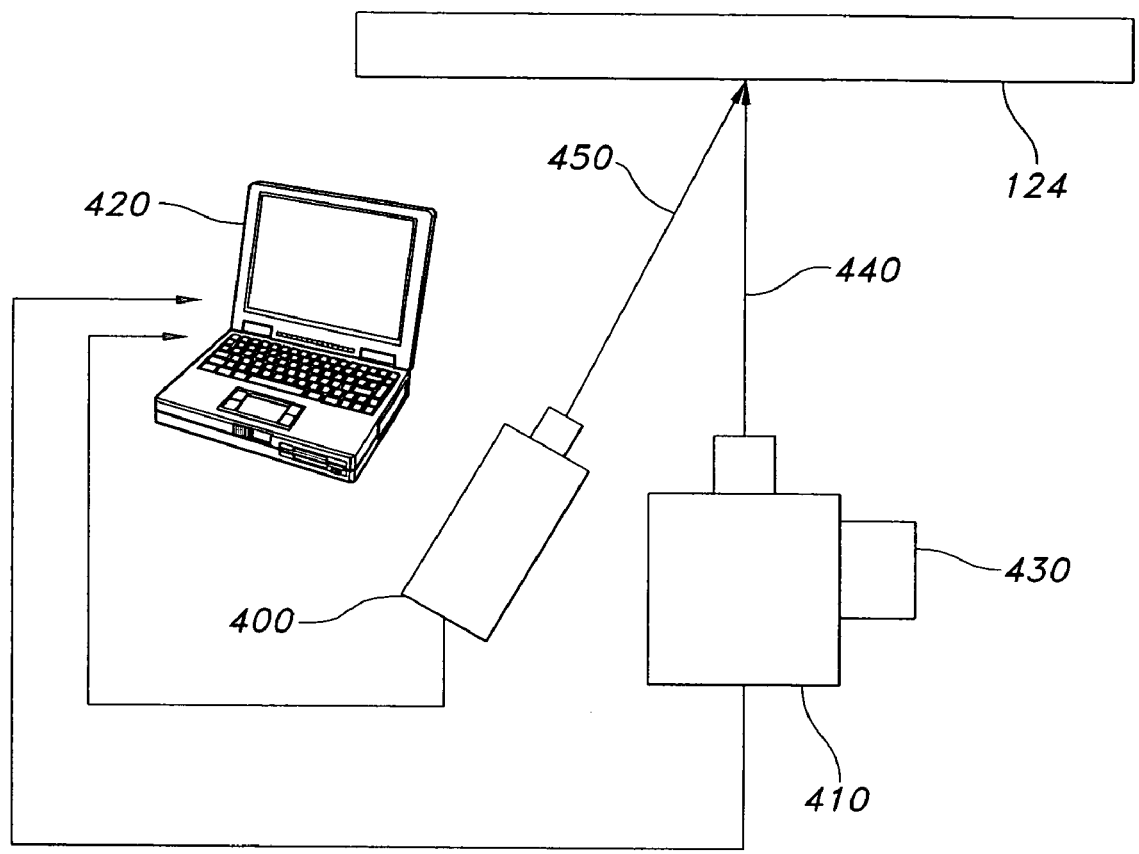
FIG. 7 is a diagram illustrating a laptop computer connected to a reference device and the projection system of FIG. 1 having a waste gate calibration system in accordance with an exemplary embodiment of a calibration system and method according to the present disclosure.

FIG. 7 is a diagram illustrating a calibration arrangement with a reference device 400 and a projector system 410, both operably connected to a laptop computer 420. The projector system 410 includes a waste gate calibration system 430 in accordance with an exemplary embodiment of the present disclosure. The projector system 410 projects an image signal 440 on a surface of screen 124 while the reference device 400 measures a set of color patches (not shown) displayed on the screen 124 from image signal 440 indicated generally with ray 450.

The system illustrated in FIG. 7 provides a means for absolute colorimetry in a DLP system by using an external sensor or reference device 400 to measure the screen image to close the loop and to provide data to adjust the internal calibration sensor 300 of system 430. Absolute calibration is accomplished by adding reference device 400, which provides a means to remotely sense the intensity and spectral character of the image on the screen, and provide feedback for the waste gate calibration system 430 that is contained within the projection system 410.

The goal of the calibration system 430 is to estimate the amount and absolute color of light on the screen 124 as projected by the projector system 410; hence, it is necessary to calibrate the system 410 using the external reference device 400 as illustrated in FIG. 7. The bias terms are directly proportional to the maximum luminance and minimum luminance recorded at the surface of the screen 124 and may be calculated using the following set of equations:

$$Bias_{Red} = (Y_{white} * Hblack_{Red} - Y_{black} * Hwhite_{Red}) / (Y_{white} - Y_{black})$$

$$Bias_{Green} = (Y_{white} * Hblack_{Green} - Y_{black} * Hwhite_{Green}) / (Y_{white} - Y_{black})$$

$$Bias_{Blue} = (Y_{white} * Hblack_{Blue} - Y_{black} * Hwhite_{Blue}) / (Y_{white} - Y_{black})  \quad \text{Equation Set 4}$$

After the bias terms are computed, the calorimetric calibration can be performed as described in the following manner:

1. A calorimeter is used as the reference device 700 to measure a set of color patches displayed on the screen 124.
2. Simultaneously, the RGB exposure data from the internal sensor 300 associated with the waste gate calibration system 430 is collected and bias corrected.
3. The two sets of data are entered into a matrix calculation of the following form:

$$\begin{bmatrix} X_{red} & X_{grn} & X_{blu} & X_{wht} \\ Y_{red} & Y_{grn} & Y_{blu} & Y_{wht} \\ Z_{red} & Z_{grn} & Z_{blu} & Z_{wht} \end{bmatrix} = \begin{bmatrix} m_{11} & \cdots & \cdots \\ \cdots & \cdots & \cdots \\ \cdots & \cdots & m_{33} \end{bmatrix} \begin{bmatrix} R_{red} & R_{grn} & R_{blu} & R_{wht} \\ G_{red} & G_{grn} & G_{blu} & G_{wht} \\ B_{red} & B_{grn} & B_{blu} & B_{wht} \end{bmatrix}$$

4. Then the 3×3 matrix is computed using traditional least squares fitting methods.

Relative calibration is accomplished using the measure of a "full light" to "full dark" ratio and developing a level-by-level calibration map in the form of a lookup table or algorithm. More specifically, sensor 300 is used to provide relative colorimetry normalizing the system by measuring the full-on and full-off intensities and developing the appropriate lookup table calibration means or calibrating algorithm parameters. The calibration map may be applied to the drive constants for the DMD drive engine, i.e., the control system for the individual mirrors associated with a DMD system, or interfaced with the data stream as it enters an image display buffer, to effect the desired system calibration.

In sum, all of the light in a digital light projection system impinges on the DMD accompanied by a significant amount of associated heat and the DMD device presents severe space limitations. Both of these factors complicate calibration of the DMD with normally used light sensing devices.

By recognizing that the wasted light reflected to a waste gate area is highly correlated with the image signal, and that variations develop in the projection system over time, as well as system to system variations, the above described calibration device, system and method are clearly desired and of advantageous utility. In collecting the correlated waste light with an optical fiber element, e.g., an optical fiber mat, in communication with a color sensor, one can develop the necessary table, calculations and algorithms to provide calibration of the primary projected image.

Using an optical fiber light collection mat, as described herein, isolates the sensor from the heat associated with the collected light, enabling the use of semiconductor light sensing elements or other light sensing means, and beneficially reduces thermally aggravated parameter drift. Further, use of an optical fiber light collection mat allows the calibration sensor to be positioned remotely from the DMD device, overcoming issues associated with inherent space limitations. Furthermore, the method and system described herein is non-invasive and may be applied to existing designs with minimal modification.

The present disclosure thus provides for devices, systems and methods for, among other things, providing: (i) a means enabling the use of semiconductor detectors to calibrate DLP and DMD systems in a hostile ambient environment; (ii) use of the light rejected from passing to the screen or the light rejected from the image (i.e. light redirected away from the primary projection axis to a waste light area) as a source for system calibration; (iii) a means for absolute colorimetry in a DLP system by using an external sensor measuring the screen image to close the loop, to provide data to adjust the internal calibration sensor of the system; (iv) a means for relative colorimetry, using an internal calibration sensor for normalizing the system by measuring the full-on and full-off intensities and developing the appropriate look-up table calibration means or calibrating algorithm parameters; (v) a means to accommodate and/or utilize as much of the odd shaped waste gate area as possible to collect the greatest amount of light entering the waste gate; (vi) a sensor and algorithm with sufficient resolution that it can operate on a "small-difference-of-two-large-numbers" signal with sufficient accuracy; (vii) use of a light intensity to frequency converter and selectable time integration windows to select resolution statically or dynamically; (viii) monitoring and use of the on-to-off light ratio to calibrate intensity range and compensate for the presence of losses and slowly changing variables, when calibrating a DMD device; (ix) a calibration means that is a function of image content, an external screen image sensor and/or environmental factors; and (x) an ability to detect and to provide feedback when any element of the system has gone out of operating range.

From the foregoing, it will be readily apparent to those skilled in the pertinent art that the advantageous structures associated with the exemplary calibration devices, systems and methods disclosed herein may be modified, in whole or in part, as may be desired to achieve specific design and/or operational objectives and/or requirements without departing from the scope of the present disclosure.

Although the present disclosure has been provided with reference to exemplary embodiments thereof, the present disclosure is not to be limited thereto. Rather, modifications, enhancements and/or variations to the disclosed devices, systems and features are contemplated, and such modifications, enhancements and/or variations will not depart from the spirit or scope of the present disclosure. Moreover, it is specifically contemplated that any one or more of the disclosed exemplary structures may be employed in a DLP, but that it is not necessary that all such structures be implemented to realize the benefits associated with each structure individually. Thus, persons of ordinary skill in the art will understand that the advantageous structures disclosed herein may be employed, in whole or in part, as may be desired to achieve specific design and/or operational objectives and/or requirements.

The invention claimed is:

1. A device, comprising:
   a light collector disposed at a waste gate area of a digital light processing projection system; and
   an optical sensor in operable communication with said light collector, wherein said sensor receives wasted reflected light from said waste gate area, said wasted reflected light substantially correlated to a light signal striking an image display.

2. A device according to claim 1, wherein the light collector includes an optical fiber mat.

3. A device according to claim 2, wherein the waste gate area defines a geometry and wherein the optical fiber mat is configured and dimensioned to substantially correspond to the waste gate area geometry.

4. A device according to claim 2, wherein the optical fiber mat is woven from plastic optical fibers and fill thread.

5. A device according to claim 2, wherein the optical fiber mat is multi-layered and includes a reflector layer and a clear top layer to provide increased durability.

6. A device according to claim 1, further comprising a light-transmitting fiber for transmitting light from the light collector to the optical sensor.

7. A device according to claim 1, wherein measurement of the wasted reflected light is used to generate a calibration map for calibration of a digital micro-mirror device (DMD).

8. A system for providing calibration in a DLP system comprising:
   an external sensor sensing at least one of intensity and spectral character of a light signal striking image on a display;
   a light collector disposed at a waste gate area of a digital light processing projection system; and
   an optical sensor in operable communication with said light collector, wherein said sensor receives wasted reflected light from said waste gate area, said wasted reflected light substantially correlated to the light signal striking said display.

9. A system according to claim 8, wherein the light collector includes an optical fiber mat.

10. A system according to claim 9, wherein the waste gate area defines a geometry and wherein the optical fiber mat is configured and dimensioned to substantially correspond to the waste gate area geometry.

11. A system according to claim 8, wherein measurement of the wasted reflected light is used to generate a calibration map for calibration of a digital micro-mirror device (DMD).

12. A system according to claim 11, wherein the calibration map is applied to drive constants associated with the digital micro-mirror device (DMD).

13. A system according to claim 11, wherein the calibration map is applied through an interface to a data stream associated with the digital micro-mirror device (DMD).

14. A method of calibrating a projection system, the method comprising:
   disposing a light collector at a waste gate area in the projection system; and
   receiving wasted reflected light at an optical sensor having R, G, B and unfiltered sensors, wherein an output of each R, G, B and unfiltered sensor is a time varying waveform having a frequency linearly proportional to wasted reflected light striking said each R, G, B and unfiltered sensor.

15. A method according to claim 14, further comprising:
measuring a first set of data corresponding to a set of color patches from a display with an external reference device;
collecting a second set of data corresponding to RGB exposure data from an internal optical sensor and collecting a bias simultaneously with said measuring;
entering said first and second sets of data into a corresponding matrix; and
computing a resulting 3×3 matrix using a least squares method.

16. A method according to claim 14, further comprising generating a calibration map based on the time varying waveform.

17. A method according to claim 16, further comprising applying the calibration map to drive constants associated with a digital micro-mirror device (DMD).

18. A method according to claim 16, further comprising applying the calibration map to a data stream associated with a digital micro-mirror device (DMD).

19. A method according to claim 14, wherein the light collector includes an optical fiber mat.

20. A method according to claim 14, wherein the optical sensor is spaced from the light collector a distance sufficient to avoid heat damage to the optical sensor based on heat generated in the waste gate area.

* * * * *